A. L. MARGACH.
AUTOMATIC FEEDING DEVICE FOR LINE CASTING MACHINES.
APPLICATION FILED NOV. 23, 1914.
1,175,466.
Patented Mar. 14, 1916
2 SHEETS—SHEET 1.
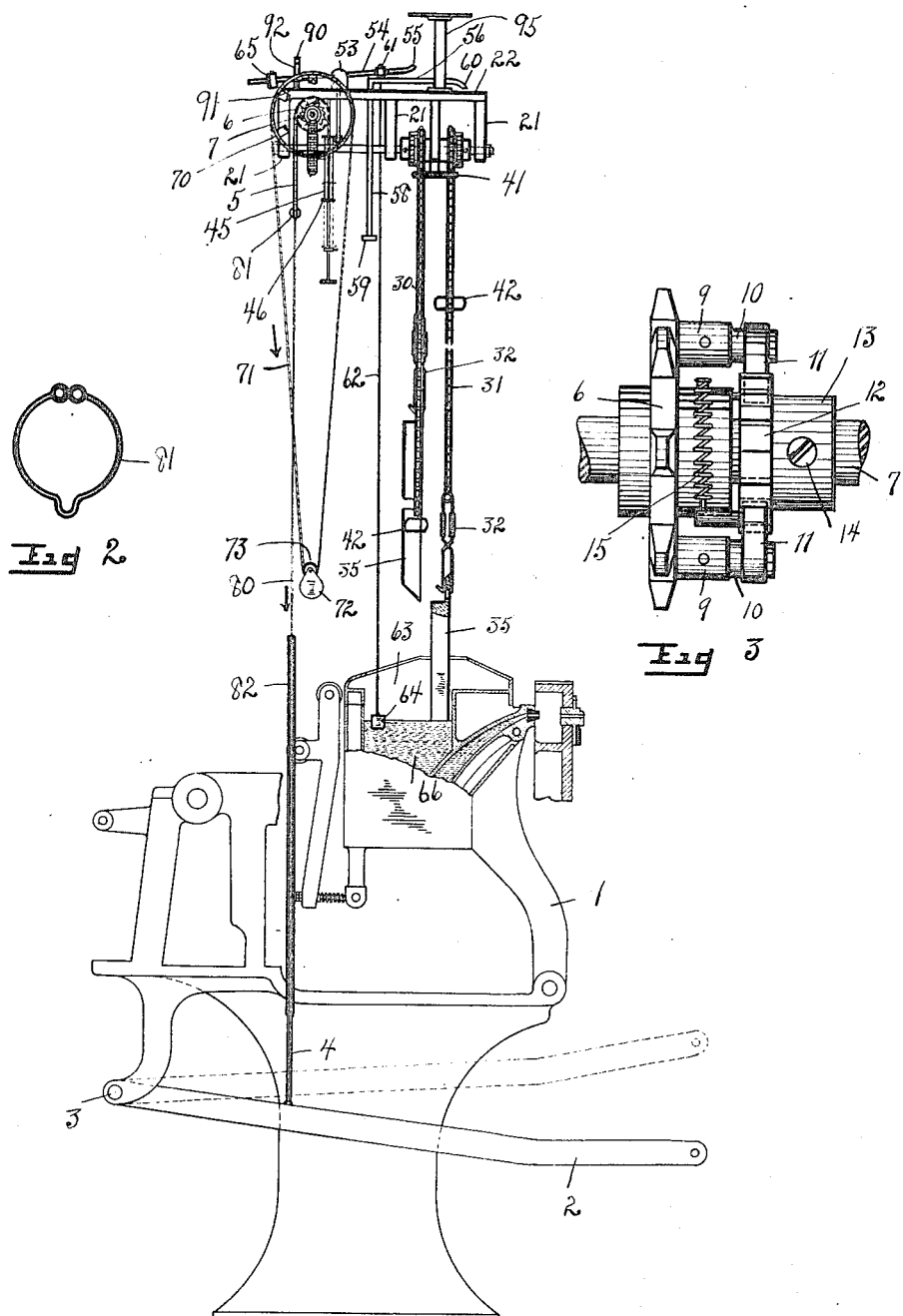
WITNESSES:
C. Walter Martin
Samuel Sloan
INVENTOR
ANDREW. L. MARGACH.
BY
Thomas L. Wilder
ATTORNEY

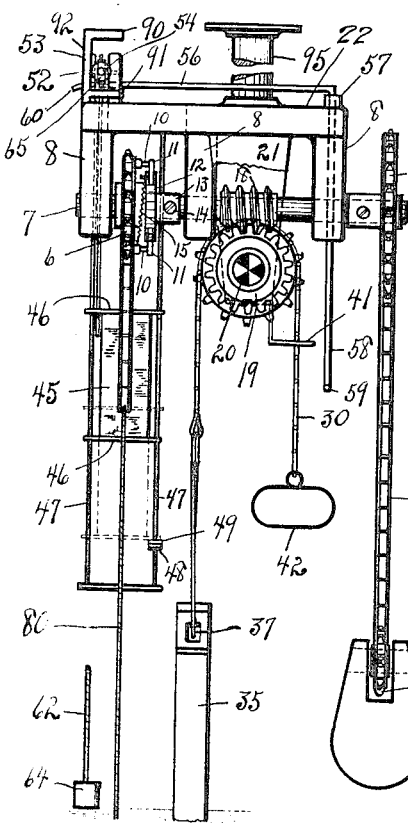

UNITED STATES PATENT OFFICE.

ANDREW L. MARGACH, OF UTICA, NEW YORK.

AUTOMATIC FEEDING DEVICE FOR LINE-CASTING MACHINES.

1,175,466.     Specification of Letters Patent.     Patented Mar. 14, 1916.

Application filed November 23, 1914. Serial No. 873,455.

*To all whom it may concern:*

Be it known that I, ANDREW L. MARGACH, a citizen of the United States, residing at Utica, in the county of Oneida and State of New York, have invented certain new and useful Improvements in Automatic Feeding Devices for Line-Casting Machines, of which the following is a specification, reference being had therein to the accompanying drawing.

My invention relates to an automatic feeding device for line casting machines and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a simple, efficient device for automatically feeding pigs or ingots to the heated metal pot of a line casting or typesetting machine, so as to maintain a constant supply of metal therein. The device accomplishes this purpose through the employment of mechanical mechanism, as distinguished from the devices heretofore made which operate manually or by the use of gas.

In the accompanying drawings; Figure 1 is an end elevation of the device, parts being broken away, showing the same disposed in suitable location with reference to a typesetting machine; Fig. 2 is an enlarged detail view of a ring or hook employed; Fig. 3 is an enlarged fragmentary view of a sprocket and immediate parts employed; Fig. 4 is an enlarged end elevation of the device, showing parts broken away; Fig. 5 is an enlarged side elevation of the device, with parts broken away; Fig. 6 is an enlarged detail view of a sprocket, showing a side elevation thereof and the immediate parts employed on the device; Fig. 7 is a plan view looking from beneath upward at the device, certain chains being removed.

Referring more particularly to the drawings, a typesetting machine is represented by —1—, which has the usual well known first elevator lever 2, fulcrumed at 3 and adapted to move, in the normal working of the machine, within the arc indicated by the dotted lines in Fig. 1. To the arm 2 is secured a chain 4, fastened to a wire 80, having on its upper end a hook or ring 81, adapted to release under the influence of abnormal strain and to be attached to any one of the links of a sprocket chain 5. There is a flexible metal tube 82, through which a portion of the wire 80 projects and is fastened, to the typesetting machine —1—, whereby to prevent the same from interfering or contacting with the adjacent members of the said machine. The function of the chain 4 is to localize the slack that occurs when the sprocket chain 5 is locked against its normal movement. The sprocket chain 5 runs upon a sprocket 6, loosely mounted upon a shaft 7, having bearings in the depending brackets 8, formed integral with the member 22. The sprocket wheel 6 has the lateral projecting hollow lugs 9 in which are secured by set screws the spindles 10, pivotally supporting the pawls 11, adapted to engage the teeth of a ratchet wheel 12, having the hub 13 rigidly fixed to the shaft 7 by a set screw 14. The pawls 11 are held yieldingly in engagement with the teeth of the ratchet wheel 12 by the coiled springs 15—15, secured at one end to the pins, 16, projecting laterally from the free ends of the pawls 11 and at the other ends to the screws 17 fastened to the stock of the sprocket wheel 6. Located adjacent the middle portion of the shaft 7 and formed integral therewith is a worm 18 in mesh with a worm gear 19, adapted to turn with the shaft 20, having bearings in the depending brackets 21—21—21, integral with the member 22.

Near one end of the shaft 20, there is loosely mounted thereon the sprockets 23 and 24, which have, similar to the sprocket 6, the hollow lugs 9 for the mounting of the spindles 10 pivotally supporting the pawls 11 adapted to engage the ratchets 25 and 26 respectively. The hubs 27 and 28 of the ratchets 25 and 26 are secured to the shaft 20 by the set screws 29. The pawls 11 of the sprockets 23 and 24 are held yieldingly in engagement with the teeth of the ratchet wheels 25 and 26 by the coiled springs 15, fastened at one end to the lateral projecting pins 16 of the pawls 11 and at the other end to the stock of the sprockets 23 and 24, similar to the construction above mentioned with respect to the sprocket wheel 6. There is adapted to run over the sprocket wheels 23 and 24, the sprocket chains 30 and 31 respectively. To one end of each of the sprocket chains 30 and 31 is secured the hook 32 having the wooden grips 85 and the open ends 33 adapted to spread automatically when coming in contact with the beveled upper edge 34 of the pigs or ingots 35, so that the lower members 36 of the hooks 32 will be projected through the holes 37 of the pigs 35. The portion of the sprocket chains 30 and 31 on the opposite side of the sprockets 23 and 24 to which the pigs or ingots 35 are suspended, pass down through the respective apertures 40—40 formed in the bracket 41, attached to one of the depending brackets 21. These free ends of the chains 30 and 31 are provided with the grips 42, which are too large to pass through the apertures 40 of the bracket 41, for a reason to be hereinafter described.

The end of the sprocket chain 5, opposite to the end to which the hook 81 and wire 80 is attached, runs over the sprocket wheel 6 and is secured at its end link to the weight 45 having the upper and lower members 46 with holes in their ends for the projection of the guide rods 47—47, depending from the member 22, whereby the weight 45 may be vertically reciprocated along said rods within the limits, as defined by the under surface of the member 22 and the adjustable collar 48, held in position upon one of the rods 47 by a set screw. The collar 48 is cushioned with a washer 49 made of cork or other yielding substance, whereby to deaden the sound made by the weight 45 descending thereon. In order to hold the weight 45 in the elevated position of its path of movement, to thereby stop the feeding operation of the device, there is adapted to coöperate with the upper member 46 of the weight 45, the hook 50 of the arm 51, fulcrumed at 52 upon the bracket 53, secured to the member 22. Rigidly fixed to the arm 51, adjacent the fulcrum 52 and at right angles to said arm, is a rod 54, which is adapted to yield slightly to give a certain resilient tendency to the arm 51, whereby the member 46 of the weight 45 may readily pass above the hook 51, when said hook is moved into the locking position and held therein by the elbow 56. The rod 54 has its outer end upturned at 55 to permit of the easy passage thereunder of the elbow 56, fulcrumed at 57 and having an integral depending handle 58 provided with a gripping member 59. The fulcrum 57 comprises an orifice in the member 22 for the downward extension of the handle 58. The outer end of the elbow 56 is bent or inclined downward at 60, whereby to freely pass beneath the rod 54, when so turned by the grip 59 to thereby lock the device against further operation.

The end of the rod 54 adjacent the upturned portion 55 has attached an adjustable collar 61 to which is fastened a wire or chain 62 adapted to suspend in the pot 63 of the typesetting machine the weight 64, buoyantly supported by the molten metal 66 therein. Upon the opposite end of the rod 54, there is mounted an adjustable counterweight 65 adapted to hold the rod 54 and arm 51 in the full line or locking position indicated in Fig. 5, when the weight 64 is floating upon the surface of the molten metal 66 in the pot 63. The rod 54 and the arm 51 are prevented from turning upon the fulcrum 52 outside of the limits defined by the dotted lines in Fig. 5, by the upper and lower arms 90 and 91 of the bracket 92, attached to the member 22, whereby the accidental raising of the weight 64 may not allow the rod 54 and arm 51 to revolve abnormally upon the said fulcrum 52.

On the outer end of the shaft 7, there is keyed a sprocket wheel 70 over which runs an endless sprocket chain 71, weighed down by the member 72 in which is pivoted a sprocket pinion 73. The sprocket wheel 70 can be turned by manually pulling upon the chain 71 in the direction indicated by the arrow in Figs. 1 and 5, whereby to revolve with increased velocity the shaft 7 and consequently the shaft 20 and the sprockets 23 and 24, so as to run the sprocket chains 30 and 31 over the said sprockets 23 and 24 to rapidly lower the pigs or ingots 35 suspended from the ends of said chains to their normal disposition above the pot 63 of the type-setting machine.

The operation of the device is effected by first engaging the pigs or ingots 35 with the hooks 32. The pig 35 thus suspended by the chain 31 will then be elevated to a position above the pot 63, so as to be gradually fed therein, by grasping the grip 42 located on the opposite end of the said chain 31 and pulling down thereon. While thus pulling on the chain 31, the pawls 11 will ride over the teeth of the ratchet 26, whereby to permit the sprocket 24 to turn freely on the shaft 20 for so elevating the pig 35. Immediately the hand of the operator is withdrawn from the grip 42, the pawls 11 will again engage the teeth of the ratchet 26 to prevent the sprocket 24 from turning, except with the turning of the shaft 20. The pig 35 suspended by the chain 30 will be elevated likewise to a position where its lower end will lie adjacent the upper end of the pig being fed, as illustrated in Fig. 1, so as to be fed to the pot 63 in continuation of the pig 35 suspended from the chain 31. This disposition of the pigs 35 with relation to the pot 63 will be maintained in a constant manner by the gradual or intermittent actuation of the sprockets 23 and 24 caused by the movement of the sprocket chain 5 in the direction indicated by the arrow in Fig. 5, which is thus actuated by the lever 2, through its connecting members, the wire 80 and the chain 4, when the said lever 2 is rocked to the full line position illustrated in Fig. 1. As the sprocket chain 5 runs over the sprocket 6 in this direction, the pawls 11 will engage the teeth of the ratchet wheel 12, whereby to turn the shaft 7 and its intermediately connected parts, the sprockets 23 and 24. Immediately the lever 2 starts to rock back into the dotted line position illustrated in Fig. 1, the sprocket chain 5 will be free to move back into its initial position under the influence or gravitation of the weight 45, so that the sprocket chain 5 will be brought again into position for rotating the sprocket wheel 6, and the shaft 7 and the intermediately connected sprockets 23 and 24. The pawls 11, in this instance, will ride over the teeth of the ratchet 12, whereby to permit the sprocket wheel 6 to turn independently of the shaft 7. The pigs or ingots 35 will be thus gradually lowered, step by step, into the pot 63 until the molten metal 66 therein reaches a predetermined height where any further metal would be a surplusage. At this point, the weight 64 will float upon the surface of said molten metal 66 and thereby relieve the tension upon the cord or chain 62, so as to permit the counter weight 65 to rock the rod 54 and the arm 51 into the full line position illustrated in Fig. 5. In this position, the hook 50 of the arm 51 will yield sufficiently to allow for the passage thereabove of the upper member 46 of the weight 45 during the succeeding elevation of the weight 45 after the slackening in the chain 62 occurs. The hook 51 will continue to hold the upper member 46 of the weight 45 in elevated or inoperative position, so long as the molten metal 66 in the pot 63 remains at the predetermined height. Immediately, however, the said molten metal drops below the said given height in the pot 63, the weight 64 will again cause a tension on the chain 62, whereby to rock the rod 54 and the arm 51 into the dotted line position illustrated in Fig. 5 in order to draw the hook 50 clear of the upper member 46 of the weight 45 to permit the lowering of said weight 45 and its consequent vertical reciprocation under the influence of the alternate pull by the lever 2 and its own gravitation; whereupon the sprocket chain 5 will actuate the sprocket wheel 6 and the intermediately connected sprockets 23 and 24 in an intermittent manner, as before stated.

Independently of the automatic movement of the weight 64, the feeding of the pigs 35 may be stopped by manually turning the elbow 56, so as to engage the under surface of the rod 54.

When the pigs 35 have been lowered into the pot 63 of the typesetting machine to the point where the same have been nearly or completely melted or to the point where the lower members 36 of the hooks 32, reach the surface of the molten metal in the pot 63, the sprocket chains 30 and 31 in their respective order, will be automatically stopped, so that the hooks 32 will not dip into the molten metal 66, by the engagement of the grips 42 with the under surface of the bracket 41 having the apertures 40 through which said sprocket chains 30 and 31 pass. In this instance, the pawls 11 of the sprocket wheels 23 and 24 will ride over the teeth of their respective ratchets 25 and 26, whereby to allow the sprocket wheels 23 and 24 to remain stationary independent of the intermittent rotation of the shaft 20.

Should an emergency arise whereby a greater quantity of metal than a single pig 35 is required to be fed into the pot 63, both pigs 35 can be fed simultaneously by adjusting the chains 30 and 31 accordingly. The velocity with which the pigs 35 are fed into the pot 63, so as to keep a normal amount of molten metal therein, can be regulated by moving the adjustable collar 48 along the rod 47, whereby to increase or decrease the range of vertical movement of the weight 45.

The function of the worm 18 in mesh with the worm wear 19 is to not only communicate the intermittent actuation of the shaft 7 to the shaft 20 and hence the sprockets 23 and 24, but also to serve as a brake against the abnormal descent of the pigs 35, when the device is not being operated.

The feeding device may be hung in a suitable location over the typesetting machine —1— by means of the bracket 90, secured at one end to the member 22 and at the other to the ceiling of the room in which the typesetting machine is located.

Having thus described my invention, what I claim as new and desire to secure by Letters Patent is:

1. In an automatic feeding device for line casting machines, means for feeding a pig to the pot of said machines, and a weight for automatically controlling the feeding of said pig with reference to the amount of molten metal in said pot.

2. In an automatic feeding device for line casting machines, mechanical means for automatically feeding pigs to the metal pot of said line casting machines, and a weight for automatically controlling the feeding of said pigs with reference to the amount of molten metal in said pot.

3. In an automatic feeding device for line casting machines, means for holding a pig, means for intermittingly actuating said first named means, whereby to gradually feed said pig to the metal pot of a line casting machine, and a weight adapted to be buoyantly supported by the metal in said pot, whereby to automatically control the feeding of said pig to said pot.

4. In an automatic feeding device for line casting machines, means for detachably holding a pig, means for intermittingly feeding said pig to the metal pot of said machines, and a weight adapted to be buoyantly supported by the molten metal in said pot, whereby to control the actuation of said feeding means.

5. In an automatic feeding device for line casting machines, a hook for holding a pig, means for intermittingly actuating said hook, whereby to gradually feed said pig to the metal pot of a line casting machine, and means for locking said hook against its operation.

6. In an automatic feeding device for line casting machines, means for detachably holding a pig, means for intermittently actuating said first named means, whereby to gradually feed said pig to the metal pot of a line casting machine, and means for adjusting the location of said pig with reference to said pot, independently of said feeding means.

7. In an automatic feeding device for line casting machines, means for detachably holding a pig, means for intermittingly actuating said first named means, whereby to gradually feed said pig to the metal pot of said machine, means for adjusting the location of said pig with reference to said pot, independent of said feeding means, and means for stopping said feeding means.

8. In an automatic feeding device for line casting machines, means for detachably holding a pig, a sprocket chain and sprocket for intermittingly actuating said first named means, whereby to feed said pig to the metal pot of a line casting machine, and means for adjusting the disposition of said pig with reference to said pot, independently of said sprocket chain and sprocket.

9. In an automatic feeding device for line casting machines, a sprocket chain for holding a pig, means for intermittingly actuating said sprocket chain, whereby to feed said pig to the metal pot of said machine, and pawls and a ratchet wheel, whereby said pig can be elevated to a given position.

10. In an automatic feeding device for line casting machines, a shaft supporting sprocket wheels, sprocket chains running over said sprocket wheels, pigs detachably held to the ends of said sprocket chains, means for rotating said shaft in an intermittent manner, whereby to feed said pigs to the metal pot of said machine, and means for adjusting the position of said pigs with relation to said pot, substantially as described.

11. In an automatic feeding device for line casting machines, a shaft supporting sprocket wheels, sprocket chains running over said sprocket wheels, pigs detachably held to the ends of said sprocket chains, a worm gear on said shaft, a worm in mesh with said worm gear, and means for intermittingly rotating said worm, whereby to feed said pigs to the pot of a line casting machine.

12. In an automatic feeding device for line casting machines, hooks having open ends for detachably holding a pig, and means for intermittingly actuating said first named means, whereby to gradually feed said pig to the metal pot of a line casting machine, substantially as described.

13. In an automatic feeding device for line casting machines, a hook for detachably engaging a pig, and means for intermittingly actuating said hook, whereby to gradually feed said pig to the metal pot of a line casting machine.

14. In an automatic feeding device for line casting machines, a hook for detachably holding a pig, means for intermittingly actuating said hook, whereby to gradually feed said pig to the metal pot of line casting machines, and means for controlling the feeding of said pig into the pot of said machine.

15. In an automatic feeding device for line casting machines, a shaft supporting sprocket wheels, sprocket chains running over said sprocket wheels, pigs detachably held to the ends of said sprocket chains, a worm gear on said shaft, a worm in mesh with said worm gear, a sprocket wheel, a sprocket chain, and means for actuating said sprocket chain and wheel for intermittingly rotating said worm, whereby to feed said pigs to the pot of a line casting machine.

16. In a feeding device for line casting machines, means for supporting pigs, a shaft for mounting said supporting means, and a worm and gear for intermittingly actuating said shaft, whereby to gradually feed said pigs to the metal pot of said machine.

17. In a feeding device for line casting machines, chains for supporting pigs, sprocket wheels over which said chains run, a shaft for mounting said sprocket wheels, and a worm and gear for intermittingly actuating said shaft, whereby to gradually feed said pigs to the metal pot of said machine.

18. In an automatic feeding device for line casting machines, means for supporting pigs, a shaft for mounting said supporting means, a worm and gear for intermittingly actuating said shaft, and means for turning said worm, whereby to gradually feed said pigs to the metal pot of said machine.

In testimony whereof I have affixed my signature in the presence of two witnesses.

ANDREW L. MARGACH.

Witnesses:
 EDWIN L. HOCKRIDGE,
 T. L. WILDER.